3,681,272
URETHANE FOAM FORMING PROCESS USING AS A GEL CATALYST A MIXTURE OF 2-ETHYL-HEXOIC ACID AND A STANNOUS COMPOUND
Carl R. Gloskey, Hague, Netherlands, assignor to M & T Chemicals Inc., Greenwich, Conn.
No Drawing. Continuation-in-part of abandoned application Ser. No. 829,789, June 2, 1969. This application Apr. 29, 1971, Ser. No. 138,737
Int. Cl. C08g 22/42, 22/44
U.S. Cl. 260—2.5 AC                    6 Claims

ABSTRACT OF THE DISCLOSURE

A process of making a polyurethane plastic which comprises mixing an organic compound having reactive hydrogen atoms as determined by the Zerewitinoff method having a molecular weight of at least about 500, an organic polyisocyanate, water and a catalytic amount of a catalyst containing a carboxylic acid and at least one member of the group consisting of stannous hydroxide, bis(ethylhexanoxyloxytin) oxide, ethylhexanoxyltin hydroxide and bis(hydroxystannous) oxide.

---

This application is a continuation-in-part of U.S. application Ser. No. 829,789, filed on June 2, 1969 now abandoned.

This invention relates to the preparation of polyurethane and more specifically to an improved process for making polyurethane plastics.

Catalysis of processes for the preparation of urethane has heretofore been effected by the use of a considerable number of materials which suffer one or more disadvantages. Strong bases such as sodium hydroxide frequently cause uncontrollable reactions and effect excessive cross-linking. Tertiary amines require elevated temperatures and effect slow reaction rates unless used in unsatisfactorily large amounts. The present invention is predicted upon the finding that a catalyst comprising a mixture of a stannous hydroxide or oxide with a monocarboxylic organic acid is ideally suited for catalyzing the reaction between organic compounds containing one or more hydroxyl groups with organic compounds containing at least two isocyanate or isothiocyanate radicals. The catalyst combination of this invention can be used in small concentrations; have no tendency to degrade the urethane polymer after it has been formed; generally, introduced no troublesome color or odor problems; and permit reactions at commercially useful and controllable rates without requiring external heating of the reactants.

It is, therefore, an object of this invention to provide a novel process for preparing a cellular or non-cellular urethane from a polyalkylene ether glycol and an organic polyisocyanate. Another object of this invention is to provide novel catalysts in the polyurethane process. A more specific object of this invention is to provide a process for making polyurethane plastics by the process which involves reacting a polyalkylene ether glycol or other polyols prepared by condensation of an alkylene oxide and an organic polyisocyanate together in which all components can be mixed together simultaneously.

SUMMARY OF THE INVENTION

The present invention provides an improved, novel gel catalyst for the preparation of urethane polymers, the catalyst comprising an aliphatic carboxylic acid containing between 8 and 12 carbon atoms and at least one compound selected from the group consisting of stannous hydroxide, bis(ethylhexanoyloxytin) oxide, 2-ethylhexanoyltin hydroxide and bis(hydroxystannous) oxide.

The present invention also provides a novel catalyst system for preparing cellular polyurethanes, said catalyst comprising the combination of a novel gel catalyst of this invention with a blowing catalyst selected from the group consisting of cyclic triethylene diamine, N-methylmorpholine and antimony tris-tallate.

DETAILED DESCRIPTION OF THE INVENTION

The weight of carboxylic acid present in the gel catalysts of this invention should be between about one and two times the weight of stannous hydroxide or oxide.

The process of this invention is particularly adapted for making both cellular polyurethanes and non-porous polyurethane plastics. The catalysts provided by this invention are efficacious in preparing substantially non-porous urethane products by casting processes or by processes in which a millable gum is formed. In processes of this type, the condensation product of an alkylene oxide is reacted with an organic polyisocyanate and a chain extender. A wide variety of chain extenders may be used such as, for example, ethylene glycol, water, diethylene glycol, trimethylol propane, diethanolamine, ethylene diamine, 1,3-butylene glycol, 1,4-butylene glycol, etc.

A variety of organic polyisocyanates may be used in the practice of this invention although diisocyanates are preferred in many formulations. Suitable polyfunctional isocyanates include alkylene diisocyanates such as hexamethylene diisocyanates, and decamethylene diisocyanates, tolylene diisocyanates, naphthalene diisocyanates, 4,4'-diphenylmethane diisocyanates, isomers or mixtures of any of these. Triisocyanates typically obtained by reaction with 3 moles of an arylene diisocyanate with 1 mole of a triol, e.g. the reaction products formed from 3 moles of tolylene diisocyanate and 1 mole of hexane triol may be employed. A preferred polyisocyanate is the mixture of 80% 2,4-tolylene diisocyanate and 20% 2,6-tolylene diisocyanate.

The term "isocyanates" is used herein to refer to polyisocyanates and to polyisothiocyanates, respectively, including particularly diisocyanates and diisothiocyanates. While the invention has been described specifically with reference to the reaction of certain diisocyanates, it is generically applicable to the reaction of any compound containing two or more —N=C=G groups in which G is oxygen or sulfur. Compounds within this generic definition include polyisocyanates and polyisothiocyanates of the general formula

in which $x$ is two or more and R can be alkylene, substituted alkylene, arylene, substituted arylene, a hydrocarbon or substituted hydrocarbon containing one or more aryl —NCG bonds and one or more alkyl —NCG bonds, a hydrocarbon or substituted hydrocarbon containing a plurality of either aryl —NCG or alkyl —NCG bonds. R can also include radicals such as —R—Z—R where Z may be any divalent moiety such as —O—, —O—R—O—, —CO—, —CO$_2$—, —S— —S—R—S—, —SO$_2$—, etc. Examples of such compounds include hexamethylene diisocyanate, 1,8-diisocyanato-p-methane, xylylene diisocyanates, (OCNCH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5 - diisocyanate, triphenylmethane-4,4',4" - triisocyanate, xylene-α,α'-diisothiocyanate, and isopropylbenzene-α,4-diisocyanate.

Further included are dimers and trimers of isocyanates and diisocyanates and polymeric diisocyanates of the general formulae

in which x and y are two or more, as well as compounds of the general formula $$M(NCG)_x$$

in which x is two ore more and M is a difunctional or polyfunctional atom or group. Examples of this type include ethylphosphonic diisocyanate, $C_2H_5P(O)(NCO)_2$; phenylphosphonic diisocyanate, $C_6H_5P(NCO)_2$; compounds containing a $\equiv$Si—NCG group, isocyanates derived from sulfonamides ($RSO_2NCO$), cyanic acid, and thiocyanic acid.

Substances having two or more active hydrogen atoms determined by the Zerewitinoff method operative in the practice of this invention are those organic compounds having two or more reactive hydrogen atoms which react with organic polyfunctional isocyanates to give urethane polymers. These polyalkylene polyols, typically exhibiting an average molecular weight of at least about 500, include polyesters, polyethers, polyisocyanate modified polyesters, amides, alkylene glycols, polymercaptans, polyamines, polyisocyanate modified alkylene glycol, etc. These polyalkylene polyols may exhibit active primary or secondary hydroxyl groups. The polyalkylene polyol hydroxy containing polyethers or polyesters include fatty acid glycerides. Polyesters which are a preferred type of polyalkylene polyol may be obtained by the esterification condensation reaction of aliphatic dibasic carboxylic acid with a glycol or a triol, or mixtures thereof, in proportions such that the resultant polyesters may contain predominately terminal hydroxyl groups. The dibasic carboxylic acids suitable for preparing polyesters include aliphatic and aromatic acids such as adipic acid, fumaric acid, sebasic acid, phthalic acid, etc. Suitable alcohols include ethylene glycols, diethylene glycols, trimethylol propane, etc. The fatty acid glycerides include those having a hydroxyl number of at least 50, such as castor oil, hydrogenated castor oil or blown natural oils.

Polyethers, a preferred type of polyalkylene polyol, include polyalkylene glycols, e.g. polyethylene glycols and polypropylene glycols, preferably having a molecular weight of at least 200.

The process of this invention is particularly suitable for the reaction of organic polyisocyanates with high molecular weight polymers having at least two end groups containing reactive hydrogen. Preferred class of such polymers includes polyoxyalkylene polyols. These are long chain polyols containing one or more chains of connected oxyalkylene groups. Most desirable, these polyoxalkylene polyols are liquid having an average molecular weight in the range of 500 to 5,000.

Examples of these polyoxylalkylene polyols include polypropylene glycols having average molecular weights of 500 to 5,000 and reaction products of propylene oxide with linear diols and higher polyols, said higher polyols when employed as reactants giving rise to branched polyoxyalkylene polyols; and ethylene oxide, propylene oxide copolymers having average molecular weights of 500 to 5,000 in which the weight ratio of ethylene oxide to propylene oxide ranges between 10:90 and 90:10, including reaction product mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols include glycerol, trimethylol propane, 1,2,6-hexane triol, pentaerythritol and sorbitol.

Another class of polymers having terminal groups that contain reactive hydrogen atoms suitable for reaction with polyisocyanates are lactone polymers, preferably those exhibiting molecular weights within the range of 500 to 10,000.

In the preparation of a cellular polyurethane, water is mixed with the condensation product of an alkylene oxide and an organic polyisocyanate to produce carbon dioxide which acts as a blowing agent. Many foaming or blowing catalysts may be used to accelerate the formation of cellular polyurethane.

The preparation of polyether based urethane foams can be carried out by forming a prepolymer, i.e. prereacting molar equivalents of the polyether and isocyanate in the absence of water and thereafter, producing a foam by the addition of excess isocyanate, water, and the catalyst combination of this invention. The production of urethane foams may be carried out by the one shot process in which the polyether, novel catalyst and isocyanate reactants are simultaneously mixed together and allowed to react in the presence of water. Urethane foams may also be produced by the semiprepolymer technique in which the polyether reactant is partially extended with excess isocyanate to provide a reaction product containing a high percentage of free isocyanate groups (20%–35%) which is then formed in a later stage by reaction with the addition of polyether and the catalyst of this invention.

Formation of the preferred foamed products of this invention in a one shot system is effected by reacting the polyol with excess polyfunctional isocyanate in the presence of water and the novel catalyst combination of this invention.

Cell modifying agents, e.g. silicones such as trimethyl end-blocked dimethyl polyisiloxanes may also be used in the practice of this invention.

The polyfunctional isocyanate is typically present in an amount of 5% to 300%, e.g. 40% by weight of the polyol. Water should be present in an amount sufficient to react with the isocyanate to liberate sufficient gas to produce a foam of the desired physical characteristics. Approximately 1% to 10% water, based upon the weight of the polyols, is operable. The mixing of the constituents may be carried out at elevated temperatures or at room temperatures.

In a typical two-step operation, the polyols may be reacted with excess polyfunctional isocyanate in the absence of water initially. Subsequently, water and other agents are added to the mixture, i.e. it is possible to prepare a prepolymer by the reaction of the organic polyisocyanate and the organic compound containing at least two active hydrogen-containing groups in a first step and then reacting the resulting isocyanate determined prepolymer with water in the second step in the presence of the novel catalyst combination of this invention to prepare a polyurethane plastic.

The amount of isocyanate used in the preparation of polyurethanes should be such that there is more than the theoretical amount required to form a urethane linkage, —NCHO—O, in the polymer resulting from reaction with the isocyanate with the active hydrogens of the polyether. The amount of isocyanate employed generally ranges from 1 to 7 equivalents preferably 2 to 6 equivalents, per equivalent of polyether.

The reaction of excess diisocyanates with a polyoxypropylene glycol produces a polymer having terminal isocyanate groups. When it is desired to form a foam, the mixture of the isocyanate modified polyether reacts through the isocyanate groups with a chain-extending agent containing active hydrogen such as water. This involves several reactions that proceed simultaneously including the reaction between the isocyanate groups and water to form urylene links (—NHCONH—) and carbon dioxide, as well as the reaction of the urylene links so formed with unreacted isocyanate groups to form biuret cross links. Depending upon the desired density of the urethane foam and the amount of cross-linking desired, the total isocyanate equivalent to the active hydrogen equivalent should be such as to provide a ratio of 0.8 to 1.2 equivalents of isocyanate per equivalent of active hydrogen, and preferably a ratio of about 0.9 to 1.1 equivalents.

It is a feature of this invention that the synergistic catalyst combination herein noted may be used in connection with a wide variety of blowing or foaming catalysts. These may include tertiary amines, metal soaps wherein the metal may be antimony, bismuth, arsenic, manganese, iron, cobalt, nickel, alkali metal (including ammonium), alkaline earth metal, silver, zinc, cadmium, aluminum, or lead, or organotin compounds having the formula

wherein R' is hydrocarbon and X' is selected from the group consisting of the negative residual portion of an organic carboxylic acid, a mercaptan, an alcohol, a phenol, and a halogen acid.

Antimony tris-tallate is a preferred blowing catalyst. Typical tertiary amines which may be employed as blowing catalysts include N-alkyl morpholines, e.g. N-methyl morpholine, N-ethyl morpholine (NEM) and cyclic triethylene diamine including, e.g. that which is sold under the trademark DABCO. Particularly preferred tertiary amine blowing catalysts may contain N-ethyl morpholine or cyclic triethylene diamine or mixtures thereof, the mixtures containing say about 1–2 parts by weight of cyclic triethylene diamine per 3 parts of N-ethyl morpholine. Tertiary amine blowing catalysts may be particularly desirable when fast rise times are desired.

When a blowing catalyst is employed in the practice of this invention, the gel or curing catalysts may be present in a ratio of 0.1–5 parts by weight to 1 part by weight of blowing catalyst, preferably 0.5–2.5 to 1.

Preferably the catalyst mixture will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 part by weight per 100 parts of polyol, and the gel catalyst will be present in a catalytic amount corresponding to 0.005 to 4.2 parts, say 0.3 part by weight per 100 parts by polyol.

The amount of blowing agent used is not critical, but will be dictated by the type of foam desired. If a very dense foam is desired, only a small amount need be used. If a very light foam is desired a maximum amount should be used. The amount used will also depend upon the particular foaming agent. It has been found that 1.6 grams of a foaming agent of the present invention such as tertiary amyl alcohol is sufficient to foam a total ingredient mixture of 35 grams to form a fire-resistant foam having a density of 2.0 to 2.5 pounds per cubic foot.

The rigidity of the polyurethane foam may be controlled by a judicious selection of the type of polyol employed. Rigid polyurethane foams employ highly branched hydroxyl polyesters or polyethers having a hydroxyl number between about 500 and about 1,000. The flexible polyurethane foams utilize a linear or polyether having a hydroxyl number of between about 30 and 100.

The foamed compositions produced using the present catalysts are self-curing and require no additional heat.

The cellular polyurethane plastics produced in accordance with the present invention have excellent mechanical and physical properties in their bulk density, and can be modified in known manner by varying the quantity of polyisocyanate and water employed in their production. Cellular polyurethane plastics may be used in a variety of commercial applications including both thermal and sound insulation, cushions, upholstery units, dash pads and arm rests for automobiles and the like. The non-porous polyurethane plastics have good abrasion and tear resistance and can be used in the production of gears, gaskets, driving members, accumulation bladders, automobile tires, and other applications.

In the practice of this invention, a blowing catalyst may be present in ratio of 0.01 to 5 parts per part of the catalyst of this invention. In one preferred embodiment, when the gel catalyst mixture of this invention is used, the ratio of blowing catalyst to gel catalyst will be approximately 1. Preferably, the catalyst mixture will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 part by weight per 100 parts of polyol, and the gel catalyst combination will be present in catalytic amount corresponding to 0.005 to 4.2 parts, say 0.3 part by weight per 100 parts of polyol.

The following specific embodiments illustrate preferred embodiments of this invention and should not be interpreted as limiting the scope thereof.

Example 1

Practice of this invention according to its specific embodiment may be observed by forming a typical one shot polyether flexible foam by mixing (a) 100 grams of polyalkylene polyol (the polyether triol formed as the condensation product between glycerine and propylene oxide, having a molecular weight of about 3,000, a hydroxyl number of about 56, and sold either under the trademark Niax Triol LG–56 by Union Carbide Chemical Co., or GP–3030 by Wyandotte Chemical Co.); (b) 1.5 grams of silicone cell modifying agent (Union Carbide Chemical Co. L–520 brand of trimethyl end-blocked dimethyl polysiloxane); (c) 45.0 grams of tolylene diisocyanate (80%:20% ratio of 2,4- and 2,6-isomers); (d) 3.5 grams of demineralized water; (e) 0.3 gram (except as otherwise indicated) of the catalyst mixture of this invention; and (f) 0.6 gram (except as otherwise indicated) of a blowing or foaming catalyst. Table I infra discloses various specific examples using the combinations of catalysts noted, wherein a combination of N-ethyl morpholine and cyclic triethylene diamine was used as foaming catalyst. Thus, in Example 1 set forth in Table I, the reaction mixture includes polyol silicone, diisocyanate, and water, together with a blowing catalyst combination of 0.3 gram of N-ethyl morpholine and 0.3 gram of triethylene diamine.

The novel catalyst combination of Example 1 was prepared by forming a mixture of 13.57 grams of stannous hydroxide and 28.8 grams of 2-ethyl hexoic acid. 0.3 gram of the foregoing mixture was mixed into the reaction mixture simultaneously with the addition of the other components. The resulting mixture was discharged from the apparatus and a chemical reaction occurred almost instantaneously with the reaction mixture beginning to foam and to expand. After the chemical reaction subsided, the expanded cellular mixture solidified into a cellular polyurethane in approximately 98.7 seconds.

In each of the examples, all of the components of the formulation were vigorously stirred upon mixing. The reaction started substantially immediately as evidenced by foaming. The cellular polyurethane product foamed and gelled promptly. The rise time was noted as the time at which the foam had risen to its maximum height. The exotherm was measured by placing a thermometer in the foam and noting the highest temperature to which it rose. Immediately after the mass had foamed, the surface was scraped with a spatula; this was done at 5-second intervals. The gel time was that time when, after scraping, the material did not flow or knit back together. The gel and rise times obtained by these tests are readily correlatable with those obtained in commercial practice.

The surprising advantages in practice of this invention may be observed from the following comparative examples.

Example 2

A comparative polyurethane foam was prepared using only stannous hydroxide as a gelling catalyst. The procedure of preparing the foam of Example 2 was identical with that followed in preparing the foams of Example 1, except in the omission of 2-ethyl heroic acid.

The attempt to use stannous hydroxide (omitting the carboxylic acid) as a gel catalyst in a procedure identical with that of the foregoing example was unsuccessful. The foam did not rise to full height and required 201 seconds to rise.

The comparative results are set forth in Table I.

TABLE I

Example 1: Catalyst combination of this invention—rise time (seconds), 98.7

Example 2: Using stannous hydroxide alone as catalyst— rise time (seconds), 201

It may be observed from the results tabulated in the foregoing table that the components of the catalyst of this invention react synergistically to effect a rise time that is a small fraction of that effected by the individual components alone.

Example 3

The process of the foregoing examples was used except that the gel catalyst was comprised of 0.3 grams of the following mixture of components:

TABLE II

| Component: | Percentage of catalyst |
|---|---|
| Bis(ethylhexanoyloxytin) oxide | 40 |
| 2-ethyl hexanoic acid | 10 |
| 2-ethylhexanoyloxytin hydroxide | 20 |
| Bis(hydroxystannous) oxide | 20 |
| Stannous hydroxide | 10 |

The blowing catalyst used was comprised of 0.3 grams of antimony tritallate rather than equal moieties of N-ethyl morpholine and cyclic triethylene diamine. The product foams may be characterized as exhibiting a rise time comparable with the foam of the preceding Example 1.

Example 4

The process of Examples 1 and 2 was used except that the gel catalyst was comprised of 0.4 gram by weight of the following composition:

TABLE III

| Component: | Percentage by weight |
|---|---|
| Bis(dodecyloxytin) oxide | 50 |
| Gallic acid | 10 |
| Hexanoyloxytin hydroxide | 10 |
| Bis(hydroxystannous) oxide | 20 |
| Stannous hydroxide | 10 |

The blowing catalyst used was comprised of 0.3 gram of antimony tritallate rather than equal moieties of N-ethyl morpholine and cyclic triethylene diamine. The product foams may be characterized as exhibiting a rise time comparable with the foam of the preceding Example 1.

Example 5

The process of Examples 1 and 2 was followed except that the novel gel catalyst was comprised of 0.6 gram by weight of the following composition:

TABLE IV

| Component: | Percentage by weight |
|---|---|
| Tetrakis (palitoyloxytin) oxide | 15 |
| Bis(2-ethylhexanoyloxytin) oxide | 30 |
| Capric acid | 20 |
| Ethylhexanoyloxytin hydroxide | 20 |
| Bis(hydroxystannous) oxide | 20 |
| Stannous hydroxide | 10 |

The blowing catalyst used was comprised of 0.3 gram of antimony tritallate rather than equal moieties of N-ethyl morpholine and cyclic triethylene diamine. The product foams may be characterized as exhibiting a rise time comparable with the foam of the preceding Example 1.

Example 6

The process of Examples 1 and 2 was followed except that the novel gel catalyst was comprised of 0.4 gram by weight of the following composition:

TABLE V

| Component: | Percentage by weight |
|---|---|
| Bis(2-ethylhexanoyloxytin) oxide | 30 |
| Caproic acid | 20 |
| Stannous hydroxy octoate | 10 |
| Stannous hydroxide | 40 |

The blowing catalyst used was comprised of 0.3 gram of antimony tritallate rather than equal moieties of N-ethyl morpholine and cyclic triethylene diamine. The product foams may be characterized as exhibiting a rise time comparable with the foam of the preceding Example 1.

Although this invention has been illustrated by reference to specific embodiments, modifications thereof which are clearly within the scope of the invention will be apparent to those skilled in the art.

What is claimed is:

1. In the preparation of a polyurethane plastic by a process which comprises reacting an organic compound having two or more reactive hydrogen atoms as determined by the Zerewitinoff method and an organic polyisocyanate, the improvement which comprises effecting said reaction in the presence of a catalytic amount of a gel catalyst comprising 2-ethylhexoic acid and at least one compound selected from the group consisting of stannous hydroxide, bis(2-ethylhexanoyloxytin) oxide, 2-ethylhexanoyloxytin hydroxide and bis(hydroxystannous) oxide and at least one blowing catalyst selected from the group consisting of cyclic triethylene diamine, N-ethyl morpholine and antimony tris-tallate.

2. The process of making a polyurethane plastic which comprises reacting an organic compound having two or more reactive hydrogen atoms as determined by the Zerewitinoff method with an organic polyisocyanate in the presence of a catalytic amount of a catalyst containing a mixture of one part by weight stannous hydroxide and two parts by weight 2-ethylhexoic acid.

3. The process for making cellular polyurethane which comprises reacting 100 parts by weight of a substance exhibiting two or more Zerewitinoff active hydrogen atoms, 5 to 50 parts by weight of an organic polyfunctional isocyanate, 0.5 to 10 parts by weight of water, 0.005 to 4.95 parts by weight of a blowing catalyst selected from the group consisting of cyclic triethylene diamine, N-ethyl morpholine, and antimony tris-tallate and 0.005 to 4.2 parts by weight of a gel catalyst containing 2-ethylhexoic acid and at least one compound selected from the group consisting of stannous hydroxide, bis(2-ethylhexanoyloxytin) oxide, 2-ethylhexanoyloxytin hydroxide and bis(hydroxystannous) oxide.

4. A novel catalytic composition suitable for use as a catalyst in the production of polyurethane foams by reaction of a substance having two or more Zerewitinoff active hydrogen atoms, an organic polyfunctional isocyanate, and water, which comprises as a gel catalyst 2-ethylhexoic acid and at least one compound selected from the group consisting of stannous hydroxide, bis(2-ethylhexanoyloxytin) oxide, 2-ethylhexanoyloxytin hydroxide and bis(hydroxystannous) oxide in a by weight ratio of 2:1 to 1:1 of acid to tin-containing compound.

5. A composition suitable for use as a catalyst in the production of polyurethane foams by the reaction of an organic compound having two or more reactive hydrogen atoms as determined by the Zerewitinoff method, water and a polyfunctional isocyanate comprising a mixture of one part by weight stannous hydroxide and two parts by weight of 2-ethylhexoic acid.

6. A novel catalytic composition suitable for use as a catalyst in the production of polyurethane foams by reaction of a substance having two or more Zerewitinoff active hydrogen atoms, a polyfunctional isocyanate, and water, which comprises one part of a blowing catalyst selected from the group consisting of cyclic triethylene diamine, N-ethyl morpholine, and antimony tris-tallate and 0.01 to 5 parts by weight of a gel catalyst comprising a mixture of substantially equal parts by weight of stannous hydroxide, 2-ethylhexoic acid and one member of the group consisting of bis(2-ethylhexanoyloxytin) oxide, 2-ethylhexanoyloxytin hydroxide and bis(hydroxystannous) oxide.

References Cited

UNITED STATES PATENTS

| | | | |
|---|---|---|---|
| 3,262,889 | 7/1966 | Edwards | 252—431 C |
| 3,392,153 | 7/1968 | Hostettler | 260—2.5 AB |
| 3,391,091 | 7/1968 | Considine | 260—2.5 AB |
| 3,245,958 | 4/1966 | Hindersinn | 260—2.5 AB |
| 2,373,387 | 4/1945 | Elliot | 260—414 |

FOREIGN PATENTS

| | | | |
|---|---|---|---|
| 948,191 | 1/1964 | Great Britain | 260—2.5 AC |

DONALD E. CZAJA, Primary Examiner

C. W. IVY, Assistant Examiner

U.S. Cl. X.R.

252—430, 431 C; 260—2.5 AB, 75 NB, 77.5 AB